United States Patent
Oxford et al.

(10) Patent No.: US 10,567,362 B2
(45) Date of Patent: Feb. 18, 2020

(54) METHOD AND SYSTEM FOR AN EFFICIENT SHARED-DERIVED SECRET PROVISIONING MECHANISM

(71) Applicant: Rubicon Labs, Inc., San Francisco, CA (US)

(72) Inventors: William V. Oxford, Austin, TX (US); Gerald E. Woodcock, III, Austin, TX (US); Stephen E. Smith, Austin, TX (US); Roderick Schultz, San Francisco, CA (US); Marcos Portnoi, Austin, TX (US); Stuart W. Juengst, Austin, TX (US); Charles T. Schad, Austin, TX (US); Michael K. Eneboe, Georgetown, TX (US); Alexander Usach, San Francisco, CA (US); Keith Evans, San Jose, CA (US)

(73) Assignee: Rubicon Labs, Inc., San Francisco, CA (US)

( * ) Notice: Subject to any disclaimer, the term of this patent is extended or adjusted under 35 U.S.C. 154(b) by 126 days.

(21) Appl. No.: 15/624,318

(22) Filed: Jun. 15, 2017

(65) Prior Publication Data
US 2017/0366527 A1    Dec. 21, 2017

Related U.S. Application Data

(60) Provisional application No. 62/351,601, filed on Jun. 17, 2016.

(51) Int. Cl.
*H04L 29/06* (2006.01)
*H04L 9/32* (2006.01)

(52) U.S. Cl.
CPC .......... *H04L 63/065* (2013.01); *H04L 9/3242* (2013.01); *H04L 63/061* (2013.01); *H04L 63/0876* (2013.01)

(58) Field of Classification Search
CPC ... H04L 63/065; H04L 63/061; H04L 63/062; H04L 63/0876; H04L 9/0891; H04L 9/3424
See application file for complete search history.

(56) References Cited

U.S. PATENT DOCUMENTS

| | | | |
|---|---|---|---|
| 7,181,015 B2 * | 2/2007 | Matt | H04L 9/083 380/279 |
| 7,908,482 B2 * | 3/2011 | Lauter | H04L 9/0844 380/277 |

(Continued)

*Primary Examiner* — Sher A Khan
(74) *Attorney, Agent, or Firm* — Sprinkle IP Law Group

(57) ABSTRACT

Embodiments of systems and methods disclosed herein include an embedded secret provisioning system that is based on a shared-derivative mechanism. Embodiments of this mechanism use a trusted third-party topology, but only a single instance of a public-private key exchange is required for initialization. Embodiments of the system and methods are secure and any of the derived secret keys are completely renewable in untrusted environments without any reliance on asymmetric cryptography. The derived secrets exhibit zero knowledge attributes and the associated zero knowledge proofs are open and available for review. Embodiments of systems and methods can be implemented in a wide range of previously-deployed devices as well as integrated into a variety of new designs using minimal roots-of-trust.

13 Claims, 9 Drawing Sheets

(56) References Cited

U.S. PATENT DOCUMENTS

| | | | | |
|---|---|---|---|---|
| 8,175,269 | B2* | 5/2012 | Pilipchuk | G06F 21/12 380/277 |
| 8,813,201 | B2* | 8/2014 | Lambert | H04L 9/0833 726/6 |
| 2001/0008015 | A1* | 7/2001 | Vu | G06F 21/34 713/189 |
| 2003/0145203 | A1* | 7/2003 | Audebert | G06Q 20/341 713/169 |
| 2007/0019807 | A1* | 1/2007 | Jung | H04L 9/0833 380/44 |
| 2007/0043946 | A1* | 2/2007 | Lauter | H04L 9/0844 713/171 |
| 2008/0013733 | A1* | 1/2008 | Johansson | H04L 9/0836 380/278 |
| 2008/0075280 | A1* | 3/2008 | Ye | H04K 1/00 380/44 |
| 2009/0013380 | A1* | 1/2009 | Chandrasiri | H04L 29/12009 726/3 |
| 2010/0037068 | A1* | 2/2010 | Murase | G06F 21/6209 713/193 |
| 2010/0122088 | A1* | 5/2010 | Oxford | G06F 21/10 713/168 |
| 2010/0332831 | A1* | 12/2010 | Shon | H04L 9/0833 713/168 |
| 2013/0054964 | A1* | 2/2013 | Messerges | H04L 9/0833 713/163 |
| 2015/0089231 | A1* | 3/2015 | Oxford | H04L 9/0869 713/171 |

\* cited by examiner

METHOD AND SYSTEM FOR AN EFFICIENT SHARED-DERIVED SECRET PROVISIONING MECHANISM

RELATED APPLICATIONS

This application claims a benefit of priority under 35 U.S.C. § 119 to U.S. Provisional Patent Application No. 62/351,601 filed Jun. 17, 2016, entitled "Method and System for an Efficient Shared-Derived Secret Provisioning Mechanism", by William V. Oxford et al., which is hereby fully incorporated by reference in its entirety.

TECHNICAL FIELD

This disclosure relates in general to security in computer systems. More specifically, this disclosure relates generally to securely creating and distributing shared secrets for a device. In particular, certain embodiments relate to efficient shared-derived secret provisioning mechanisms.

BACKGROUND

The ability to securely create and distribute shared secrets is one of the more fundamental requirements for a secure architecture. Typically, this function has mostly been accomplished using asymmetric cryptography (crypto) and established Public Key Infrastructure (PKI) mechanisms, including X.509 certificates and Certificate Authorities (CA's). While these methods are well-known and well-suited for traditional client-server topologies, the PKI approach can prove challenging for some emerging Internet of Things (IoT) device classes. Problematic devices may include those with more limited local computational capability or low-bandwidth network connections (or both).

While some IoT devices may have the ability to authenticate and exchange secret keys using asymmetric crypto, there are an increasingly large number of highly-connected (e.g. IoT) devices deployed that lack robust security. One problem with traditional devices is that many of the established security threat models are obsolete in todays' increasingly-connected designs. The result of outdated threat model assumptions is clearly illustrated by the infamous Miller-Valasek remote vehicle exploit that was first made public in 2015. This vulnerability served to illustrate the unforeseen dangers associated with linking systems that were designed to be secure in isolation to a widely visible communications network hub.

As such, it should be a guiding principle to assume that for new designs that they will ultimately be connected in some manner to a public network. Whether such a device's network connection is accomplished via a gateway or if the device is attached directly to the internet is certainly relevant. However, it is definitely not a realistic expectation that any connected device can rely on the ability of a gateway to isolate it from external attack. In order to design as robust a security architecture as possible, it should be assumed that any connected device will be continually subjected to external interrogation. In order to protect the operation of such connected devices from persistent attackers, all communications to and from the device should be authenticated, whether or not the data contained in the message is considered to be confidential. In this latter case, any such confidential data should also be encrypted. The essential issue then becomes one of secure key management.

In order to enable security in such a system, all devices should be provisioned with an embedded secret of some kind. In addition, any other entity with which these devices must securely communicate should also be provisioned with secrets of their own. In the asymmetric cryptography case, each of the (private) secrets has a non-secret counterpart that can be published without compromising the system's security. In the case of a symmetric cryptography-based system, devices that wish to communicate with each other must share the same secret. While it might at first glance seem that these two methodologies are fundamentally different, in practice, they share quite a few salient characteristics.

One shared attribute between symmetric and asymmetric cryptography systems is that they both require a trusted third party at some point in the process. In the case of an asymmetric system, the trusted third party may take the form of a certificate authority (CA). In symmetric crypto systems, the overall trust resides in the method by which secrets are provisioned to each of the devices. In the simplest symmetric case, there is a "trusted" location (or environment), where a shared secret can be directly transmitted between two devices without fear of some untrusted party eavesdropping on the communication. This approach generally requires physical isolation and it is thus not usually practical after a device has been deployed in the field.

A more complex (but more flexible) shared-secret system makes use of secured communications between each device and an independent trusted third party. The trusted third party exchanges information with each of the individual devices in order to enable secure connections between the untrusted devices. As with all such systems, there are certain assumptions that must be made in order to support the stated systems' security claims. The increased flexibility of such a trusted third-party exchange system is due to the fact that new keys may be provisioned to devices after they have been deployed in the field without requiring a trusted location in which to perform key exchanges or key rotations.

A less-appreciated, but nonetheless common characteristic of any approach to the problem is that both symmetric as well as asymmetric security systems depend on the ability of an individual device to maintain control of its own private secrets. For an asymmetric system, all devices must be trusted to not inadvertently reveal their own private secrets. In the case of symmetric crypto systems, more than one device must be entrusted with the safekeeping of the same shared secret. In either case, if any of these private secrets are ever exposed, the overall security of the system can break down. Thus, all secure devices must be able to retain and use a secret of some sort without exposing its value.

Accordingly, there is a need to find systems and methods by which the data of such security systems may likewise be secured, where by securing such data, the effectiveness of such a security system may be enhanced.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

SUMMARY OF THE DISCLOSURE

In a first example, an embedded secret provisioning systems is based on a shared-derivative (as opposed to a more straightforward shared-secret) mechanism. Embodiments of this mechanism use a trusted third-party topology, but only a single instance of a public-private key exchange is required for initialization. Embodiments of the system are secure and any of the derived secret keys are completely renewable in untrusted environments without any reliance on asymmetric cryptography. The derived secrets exhibit zero knowledge attributes and the associated zero knowledge proofs are open and available for review.

A security core includes a pair of keyed one-way secure hash function blocks and a pair of associated embedded key registers. A first embedded key register is fixed and a second embedded key register is variable. In a provisioning process, a known value is stored in the first embedded key register and represents the root of the device, and is only programmable once. Once initialized with an embedded secret value it cannot be changed or read by external observers. Using the pair of keyed one-way secure hash function blocks and the second embedded key register, various derived secrets can be generated and used, as desired.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of an architecture and topologies in which embodiments of the present invention may be effectively utilized. Commonly-assigned U.S. Pat. No. 8,438,392, entitled Method and System for Control of Code Execution on a General Purpose Computing Device and Control of Code Execution in a Recursive Security Protocol issued on May 7, 2013 and incorporated by reference herein, may also be useful to an understanding of such architectures and topologies.

Figure 1:
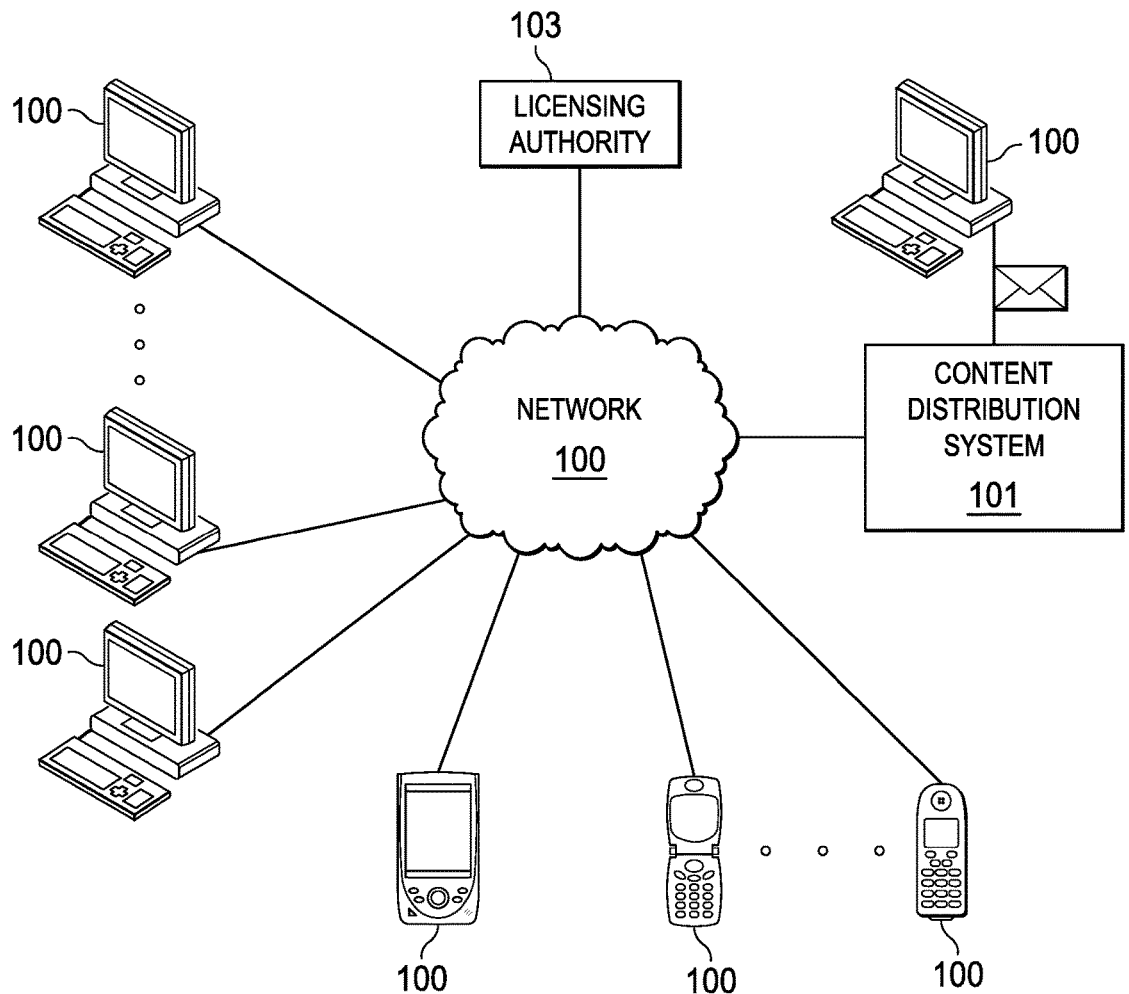
FIG. 1 depicts one embodiment of an architecture for content distribution.

FIG. 1 depicts one embodiment of such a topology. Here, a content distribution system 101 may operate to distribute digital content (which may be for example, a bitstream comprising audio or video data, a software application, etc.) to one or more target units 100 (also referred to herein as target or endpoint devices) which comprise protocol engines. These target units may be part of, for example, computing devices on a wireline or wireless network or a computer device which is not networked, such computing devices including, for example, a personal computers, cellular phones, personal data assistants, media players which may play content delivered as a bitstream over a network or on a computer readable storage media that may be delivered, for example, through the mail, etc. This digital content may compose or be distributed in such a manner such that control over the execution of the digital content may be controlled and security implemented with respect to the digital content.

In certain embodiments, control over the digital content may be exercised in conjunction with a licensing authority 103. This licensing authority 103 (which may be referred to as a central licensing authority, though it will be understood that such a licensing authority need not be centralized and whose function may be distributed, or whose function may be accomplished by content distribution system 101, manual distribution of data on a hardware device such as a memory stick, etc.) may provide a key or authorization code. This key may be a compound key (DS), that is both cryptographically dependent on the digital content distributed to the target device and bound to each target device (TDn). In one example, a target device may be attempting to execute an application in secure mode. This secure application (which may be referred to as candidate code or a candidate code block (e.g., CC)) may be used in order to access certain digital content.

Accordingly, to enable a candidate code block to run in secure mode on the processor of a particular target device 100 to which the candidate code block is distributed, the licensing authority 103 must supply a correct value of a compound key (one example of which may be referred to as an Authorization Code) to the target device on which the candidate code block is attempting to execute in secure mode (e.g., supply DS1 to TD1). No other target device (e.g., TDn, where TDn≠TD1) can run the candidate code block correctly with the compound key (e.g., DS1) and no other compound key (DSn assuming DSn≠DS1) will work correctly with that candidate code block on that target device 100 (e.g., TD1).

As will be described in more detail later on herein, when Target Device 100 (e.g., TD1) loads the candidate code block (e.g., CC1) into its instruction cache (and, for example, if CC1 is identified as code that is intended to be run in secure mode), the target device 100 (e.g., TD1) engages a hash function (which may be hardware based) that creates a message digest (e.g., MD1) of that candidate code block (e.g., CC1). The seed value for this hash function is the secret key for the target device 100 (e.g., TD1's secret key (e.g., SK1)).

In fact, such a message digest (e.g., MD1) may be a Message Authentication Code (MAC) as well as a compound key, since the hash function result depends on the seed value of the hash, the secret key of the target device 100 (e.g., SK1). Thus, the resulting value of the message digest (e.g., MD1) is cryptographically bound to both the secret key of the target device 100 and to the candidate code block. If the licensing authority distributed compound key (e.g., DS1) matches the value of the message digest (e.g., MD1) it can be assured that the candidate code block (e.g., CC1) is both unaltered as well as authorized to run in secure mode on the target device 100 (e.g., TD1). The target device 100 can then run the candidate code block in secure mode.

As can be seen then, in one embodiment, when secure mode execution for a target device 100 is performed the target device 100 may be executing code that has both been verified as unaltered from its original form, and is cryptographically "bound" to the target device 100 on which it is executing. This method of ensuring secure mode execution of a target device may be contrasted with other systems, where a processor enters secure mode upon hardware reset and then may execute in a hypervisor mode or the like in order to establish a root-of-trust.

Accordingly, using embodiments as disclosed, any or all of these data such as the compound key from the licensing authority, the message digest, the candidate code block, etc. (e.g., DS1, MD1, CC1) may be completely public as longs as the secret key for the target device 100 (e.g. SK1) is not exposed. Thus, it is desired that the value of the secret key of a target device is never exposed, either directly or indirectly. Accordingly, as discussed above, embodiments of the systems and methods presented herein, may, in addition to protecting the secret key from direct exposure, protect against indirect exposure of the secret key on target devices 100 by securing the working sets of processes executing in secure mode on target devices 100.

Figure 2:
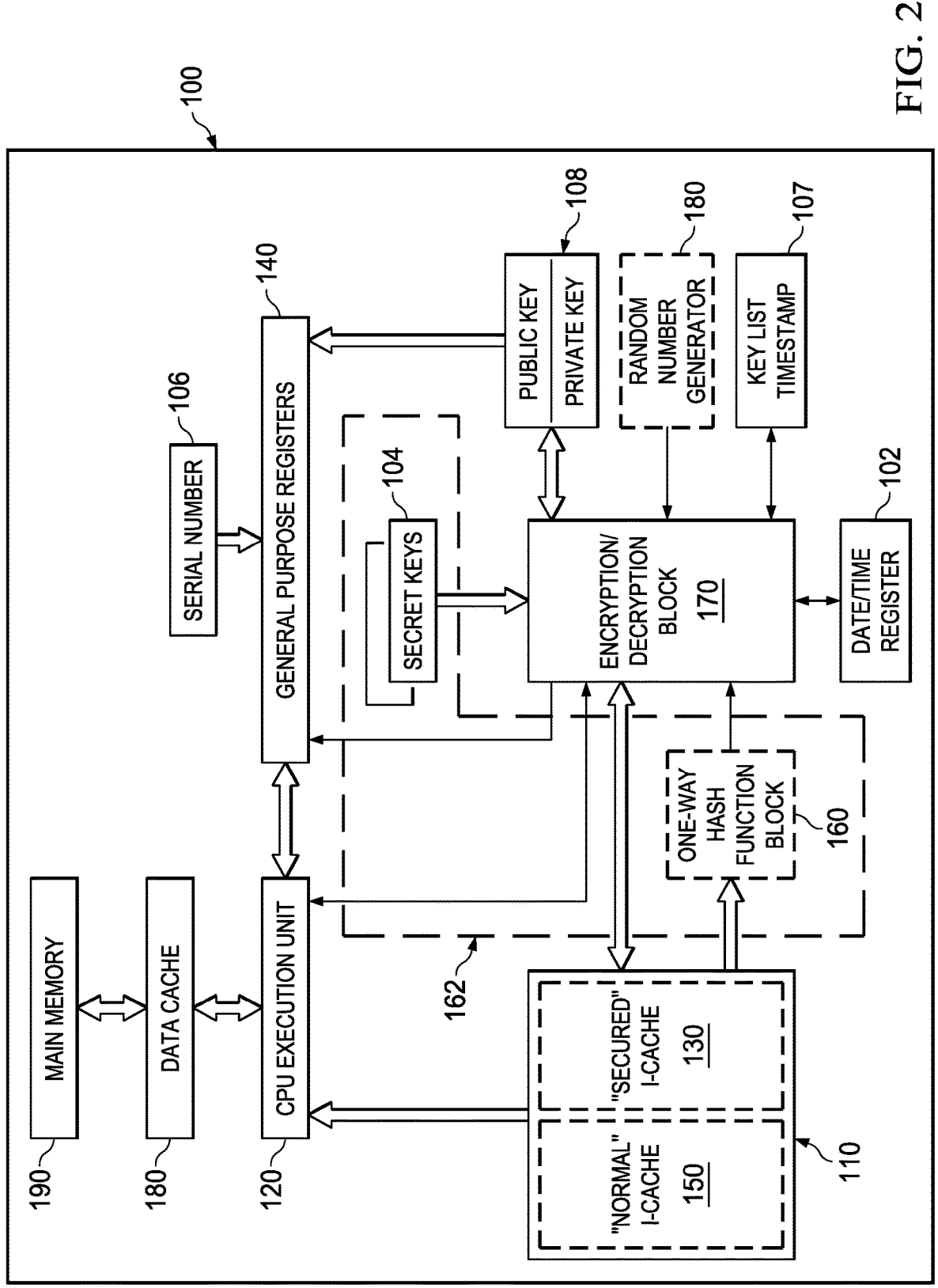
FIG. 2 depicts one embodiment of a target device.

Moving now to FIG. 2, an architecture of one embodiment of a target device that is capable of controlling the execution of the digital content or implementing security protocols in conjunction with received digital content. Elements of the target unit may include a set of blocks, which allow a process to execute in a secured mode on the target device such that when a process is executing in secured mode the working set of the process may be isolated. It will be noted that while these blocks are described as hardware in this embodiment, software may be utilized to accomplish similar functionality with equal efficacy. It will also be noted that while certain embodiments may include all the blocks described herein other embodiments may utilize lesser or additional blocks.

The target device 100 may comprise a CPU execution unit 120 which may be a processor core with an execution unit and instruction pipeline. Clock or date/time register 102 may be a free-running timer that is capable of being set or reset by a secure interaction with a central server. Since the time may be established by conducting a query of a secure time standard, it may be convenient to have this function be on-chip. Another example of such a date/time register may be a register whose value does not necessarily increment in a monotonic manner, but whose value does not repeat very often. Such a register could be useful in the case where a unique timestamp value might be required for a particular reason, but that timestamp value could not necessarily be predicted ahead of time. Thus, a pseudo-random number generator may be a suitable mechanism for implementing such a register. Another option for implementing such a function would be to use the output of a hardware hash function 160 to produce the current value of this register. In the case where the output of such a hash function is used as a seed or salt value for the input of the hash function, the resulting output series may resemble a random number sequence statistically, but the values may nonetheless be deterministic, and thus, potentially predictable. Target unit 100 may also contain a true random number generator 182 which may be configured to produce a sequence of sufficiently random numbers or which can then be used to supply seed values for a pseudo-random number generation system. This pseudo-random number generator can also potentially be implemented in hardware, software or in "secure" software.

One-way hash function block 160 may be operable for implementing a hashing function substantially in hardware. One-way hash function block 160 may be a part of a secure execution controller 162 that may be used to control the placement of the target device 100 in secure mode or that maybe used to control memory accesses (e.g., when the target device 100 is executing in secured mode), as will be described in more detail herein at a later point.

In one embodiment, one way has function block 160 may be implemented in a virtual fashion, by a secure process running on the very same CPU that is used to evaluate whether a given process is secure or not. In certain embodiments two conditions may be adhered to, ensuring that such a system may resolve correctly. First, the secure mode "evaluation" operation (e.g., the hash function) proceeds independently of the execution of the secure process that it is evaluating. Second, a chain of nested evaluations may have a definitive termination point (which may be referred to as the root of the "chain of trust" or simply the "root of trust"). In such embodiments, this "root of trust" may be the minimum portion of the system that should be implemented in some non-changeable fashion (e.g., in hardware). This minimum feature may be referred to as a "hardware root of trust". For example, in such embodiments, one such hardware root of trust might be a One-Way hash function that is realized in firmware (e.g., in non-changeable software).

Another portion of the target unit 100 may be a hardware-assisted encryption/decryption block 170 (which may be referred to as the encryption system or block, the decryption system or block or the encryption/decryption block interchangeably), which may use either the target unit's 100 secret key(s) or public/private keys (described later) or a derivative thereof, as described earlier. This encryption/decryption block 170 can be implemented in a number of ways. It should also be noted that such a combination of a One-Way Hash Function and a subsequent encryption/decryption system may comprise a digital signature generator that can be used for the validation of any digital data, whether that data is distributed in encrypted or in plaintext form. The speed and the security of the entire protocol may vary depending on the construction of this block, so it may be configured to be both flexible enough to accommodate security system updates as well as fast enough to allow the system to perform real-time decryption of time-critical messages.

It is not material to embodiments exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented. It should be noted at this point that the terms encryption and decryption will be utilized interchangeably herein when referring to engines (algorithms, hardware, software, etc.) for performing encryption/decryption. As will be realized if symmetric encryption is used in certain embodiments, the same or similar encryption or decryption engine may be utilized for both encryption and decryption. In the case of an asymmetric mechanism, the encryption and decryption functions may or may not be substantially similar, even though the keys may be different.

Target device 100 may also comprise a data cache 180, an instruction cache 110 where code that is to be executed can be stored, and main memory 190. Data cache 180 may be almost any type of cache desired such as a L1 or L2 cache. In one embodiment, data cache 180 may be configured to associate a secure process descriptor with one or more pages of the cache and may have one or more security flags associated with (all or some subset of the) lines of a data cache 180. For example, a secure process descriptor may be associated with a page of data cache 180.

Generally, embodiments of target device 100 may isolate the working set of a process executing in secure mode stored in data cache 180 such that the data is inaccessible to any other process, even after the original process terminates. More specifically, in one embodiment, the entire working set of a currently executing may be stored in data cache 180 and writes to main memory 190 and write-through of that cache (e.g., to main memory 190) disallowed (e.g., by secured execution controller 162) when executing in secured mode.

Additionally, for any of those lines of data cache 180 that are written to while executing in secure mode (e.g., a "dirty" cache line) those cache lines (or the page that comprises those cache lines) may be associated with a secure process descriptor for the currently executing process. The secure process descriptor may uniquely specify those associated "dirty" cache lines as belonging to the executing secure process, such that access to those cache lines can be restricted to only that process (e.g. be by secured execution controller 162).

In certain embodiments, in the event that the working set for a secure process overflows data cache 180 and portions of data cache 180 that include those dirty lines associated with the security descriptor of the currently executing process need to be written to main memory (e.g., a page swap or page out operation) external data transactions between the processor and the bus (e.g., an external memory bus) may be encrypted (e.g., using encryption block 170 or encryption software executing in secure mode). The encryption (and decryption) of data written to main memory may be controlled by secure execution controller 162.

The key for such an encryption may be the secure process descriptor itself or some derivative thereof and that secure descriptor may itself be encrypted (e.g., using the target device's 100 secret key 104 or some derivative thereof) and stored in the main memory 190 in encrypted form as a part of the data being written to main memory.

Instruction cache 110 is typically known as an I-Cache. In some embodiments, a characteristic of portions of this I-Cache 110 is that the data contained within certain blocks be readable only by CPU execution unit 120. In other words, this particular block of I-Cache 130 is execute-only and may not be read from, nor written to, by any executing software. This block of I-Cache 130 will also be referred to as the "secured I-Cache" 130 herein. The manner by which code to be executed is stored in this secured I-Cache block 130 may be by way of another block which may or may not be depicted. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured I-cache block 130 executing in secured mode), or if, for some reason a jump to any section of code which is located in the non-secure or "normal" I-Cache 150 or other area occurs during the execution of code stored in the secured I-Cache 130.

In one embodiment, CPU execution unit 120 may be configured to track which registers 140 are read from or written to while executing the code stored in secured I-cache block 130 and then automatically clear or disable access to these registers upon exiting the "secured execution" mode. This allows the secured code to quickly "clean-up" after itself such that only data that is permitted to be shared between two kinds of code blocks is kept intact. Another possibility is that an author of code to be executed in the secured code block 130 can explicitly identify which registers 140 are to be cleared or disabled. In the case where a secure code block is interrupted and then resumed, then these disabled registers may potentially be re-enabled if it can be determined that the secure code that is being resumed has not been tampered with during the time that it was suspended.

In one embodiment, to deal with the "leaking" of data stored in registers 140 between secure and non-secure code segments a set of registers 140 which are to be used only when the CPU 120 is executing secured code may be identified. In one embodiment, this may be accomplished utilizing a version of the register renaming and scoreboarding mechanism, which is practiced in many contemporary CPU designs. In some embodiments, the execution of a code block in secured mode is treated as an atomic action (e.g., it is non-interruptible) which may make this such renaming and scoreboarding easier to implement.

Even though there may seem to be little possibility of the CPU 120 executing a mixture of "secured" code block (code from the secured I-Cache 130) and "unsecured code" (code in another location such as normal I-cache 150 or another location in memory), such a situation may arise in the process of switching contexts such as when jumping into interrupt routines, or depending on where the CPU 120 context is stored (most CPU's store the context in main memory, where it is potentially subject to discovery and manipulation by an unsecured code block).

In order to help protect against this eventuality, in one embodiment another method which may be utilized for protecting the results obtained during the execution of a secured code block that is interrupted mid-execution from being exposed to other execution threads within a system is to disable stack pushes while a the target device 100 is operating in secured execution mode. This disabling of stack pushes will mean that a secured code block is thus not interruptible in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted.

Each target unit 100 may also have one or more secret key constants 104; the values of neither of which are software-readable. In one embodiment, the first of these keys (the primary secret key) may be organized as a set of secret keys, of which only one is readable at any particular time. If the "ownership" of a unit is changed (for example, the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. These keys are only stored and used within the security execution controller 162 of the target unit 100 as will be described.

In another embodiment, the two keys may be constructed as a list of "paired" keys, where one such key is implemented as a one-time-programmable register and the other key in the pair is implemented using a re-writeable register. In this embodiment, the re-writeable register may be initialized to a known value (e.g., zero) and the only option that may be available for the system to execute in secure mode in that state may be to write a value into the re-writeable portion of the register. Once the value in this re-writeable register is initialized with some value (e.g., one that may only be known by the Licensing Authority, for example), then the system may only then be able to execute more general purpose code while in secure mode. If this re-writeable value should be re-initialized for some reason, then the use of a new value each time this register is written may provide increased security in the face of potential replay attacks.

Yet another set of keys may operate as part of a temporary public/private key system (also known as an asymmetric key system or a PKI system). The keys in this pair may be generated on the fly and may be used for establishing a secure communications link between similar units, without the intervention of a central server. As the security of such a system is typically lower than that of an equivalent key length symmetric key encryption system, these keys may be larger in size than those of the set of secret keys mentioned above. These keys may be used in conjunction with the value that is present in the on-chip timer block in order to guard against "replay attacks", among other things. Since these keys may be generated on the fly, the manner by which they are generated may be dependent on the random number generation system 180 in order to increase the overall system security.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), and may not necessarily reflect the current time of day. This timestamp value itself may or may not be itself architecturally visible (e.g., it may not necessarily be a secret key), but nonetheless it will not be able to be modified unless the target unit 100 is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself.

Embodiments of the invention provide a simple and effective method for authentication and activation in a device assembly. An exemplary assembly may include one or more semiconductor devices assembled on a motherboard or module by a systems integrator. The assembled device may ultimately be activated by a service provider and used by a user to run one or more application developed by a software vendor. For the device to function securely, the various components and systems (e.g., semiconductor manufacturer, systems integrator, service provider, software vendor, user, etc.) used in a given task must cooperate, even though underlying entities may not share trust among one another. One important benefit of the mechanisms described is that the data encryption used by the system can be accomplished without using asymmetric encryption, which is inefficient and processor intensive. For example, in the mechanisms described below, the data encryption can be accomplished using symmetric encryption, which is much more efficient than asymmetric encryption.

In some embodiments, the embodiments relate to an efficient and secure authorization system using a distributed device activation procedure. Other embodiments relate to an efficient and secure authentication system using a hierarchical activation mechanism (such as that described in commonly-assigned U.S. patent application Ser. No. 15/167,254, filed May 27, 2016, entitled "DISTRIBUTED AND HIERARCHICAL DEVICE ACTIVATION MECHANISMS," which is hereby incorporated by reference in its entirety as if fully set forth herein).

Generally, following is a description of exemplary embedded secret provisioning systems that are based on a shared-derivative (as opposed to a more straightforward shared-secret) mechanism. Embodiments of this mechanism use a trusted third-party topology, but, in some examples, only a single instance of a public-private key exchange is required for initialization. In operation, embodiments of the system are secure and any of the derived secret keys are completely renewable in untrusted environments without any reliance on asymmetric cryptography. As opposed to more traditional shared-secret based systems, the derived secrets exhibit Zero Knowledge attributes and the associated Zero Knowledge proofs are open and available for review. Embodiments of this provisioning mechanism are ISA-agnostic and do not depend on any specific set of CPU architectural features. Thus, this system can be implemented in a wide range of previously-deployed devices as well as integrated into a variety of new designs using minimal roots-of-trust.

Figure 3:
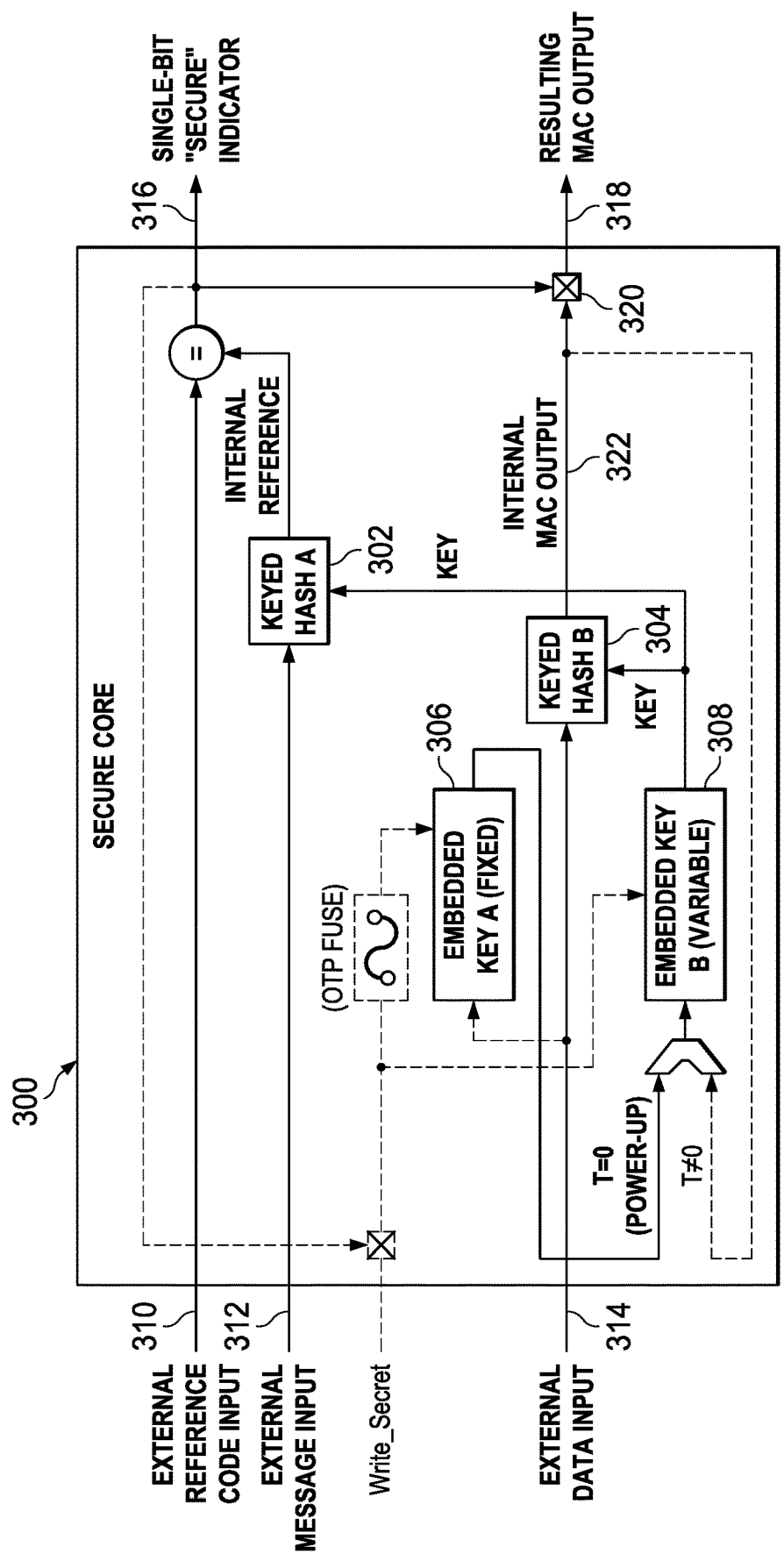
FIG. 3 depicts a block diagram of an embodiment of a security core, including a pair of keyed one-way secure hash function blocks and a pair of associated embedded key registers.

In certain embodiments, the most basic building block required to support this protocol consists of a security core, described below. FIG. 3 is a block diagram of an embodiment of a security core 300, including a pair of keyed one-way secure hash function blocks (keyed hash A 302 and keyed hash B 304) and a pair of associated embedded key registers, one fixed (static) (embedded key A 306) and one variable (embedded key B 308). Some of the device internal control lines in the block diagram shown in FIG. 3 have been deemphasized (shown by dashed lines) in order to accentuate the primary feature, which is the paired keyed hash mechanism (keyed hash A 302 and keyed hash B 304) and the associated embedded keys (embedded key A 306 and embedded key B 308).

The secure core 300 itself is a monolithic function block in certain embodiments. The secure core 300 includes several (public) data inputs (external reference code input 310, external message input 312, and external data 314) and the resulting (also public) outputs (single bit "Secure" indicator 316 and resulting MAC output 318). The (private) internal signals are shown by solid lines. Once the structure is properly provisioned with embedded secret(s) (described below), the internal signals are not visible outside of the security core 300 boundary.

There are several important aspects that should be understood regarding the embodiment of the structure shown in FIG. 3. First, the basic operation of the secure core 300 is not dependent on any specific one-way hash algorithm or any implementation thereof. Second, the mechanism shown in FIG. 3 has been depicted with two distinct hash functions (302, 304). This dual-hash structure representation is done for the sake of clarity, but the mechanism can easily be implemented with a single hash function block coupled to a simple state machine to obtain the same result as the structure shown above. Similarly, the hash functions can be performed using hardware or software, as desired.

Figure 4:
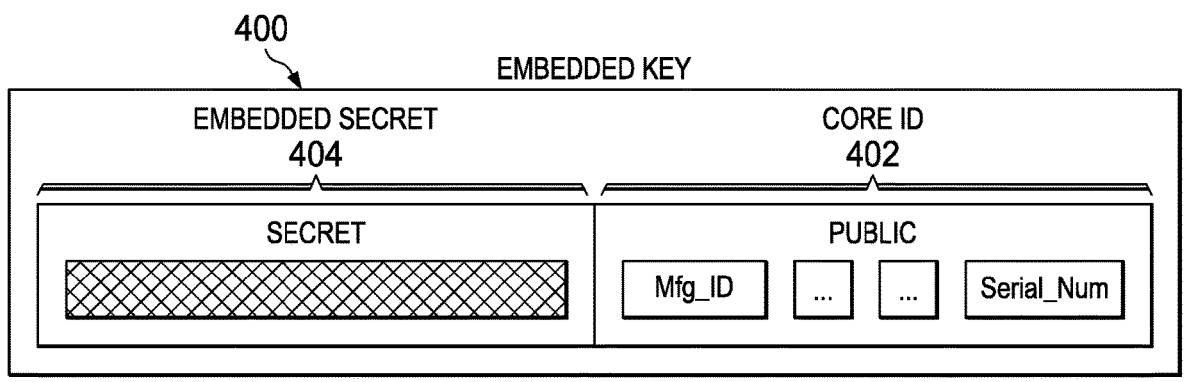
FIG. 4 is a block diagram depicting an example of a basic embedded key register structure.

FIG. 4 is a block diagram illustrating one example of a basic embedded key register structure 400. Focusing on the embedded key itself, in the embodiment depicted in FIG. 4 we can see that this structure consists of two main components: a core ID field 402 and an embedded secret field 404. The core ID field 402 functions in a manner similar to a standard serial number and this portion of the embedded key data structure 400 is not secret. However, the embedded secret portion 404 should never be made visible to the outside world, either directly or indirectly, in order for the device to operate in a secure fashion. In addition to their differences from an external visibility perspective, these two component fields also are initialized using slightly different mechanisms. Nonetheless, from the perspective of the operation of the keyed hash functions (302, 304), the combined embedded key 400 can be considered as a single monolithic register, albeit with different visibility attributes for different portions of the register.

From the cryptographic perspective, it should be noted that the embedded secret portion 404 of an embedded key 400 may only be used in the key inputs to a keyed hash function. Thus, the secret portions of these embedded key registers are not ever used directly nor are they capable of being used in isolation (even including the evaluation of the keyed hash functions). The only way that information contained within an embedded secret 404 can propagate to the outside world is through the result of evaluating at least one pass through a secure keyed hash function. Such output derivative values must also depend not only on the secret data, but also some other input data (including both the visible portions of the embedded keys as well as some externally-supplied input data to the keyed hash function). Only such derivative values are able to be used as an input to subsequent cryptographic operations.

Returning to FIG. 3, it should also be noted that the external visibility of the keyed hash B function 304 output is gated (via gate 320) by the (e.g., single-bit) result of the comparison between the Internally-calculated reference (the output of the keyed hash A function 302) and the (public) reference code input 310. If the result (output 316) of this comparison (referred to as the "secure mode" indictor) is a "1" (meaning that the two reference values match), then the output of the keyed hash B block 304 is allowed to propagate (via gate 320) to the outside world at the resulting message authentication code (MAC) output 318.

If the result of the comparison is not a "1", then the internal MAC output 322 is not allowed to propagate (via gate 320) outside of the security core 300. The effect of this arrangement is that, in certain embodiments, the only means by which an output from either of the device's keyed hash functions 302 or 304 can be made visible outside the security core boundary is through the action of a correctly-constructed external reference code input 310. However, this external reference code 310 can only be correctly constructed by an entity that is in possession of the very same embedded secrets from which the output is derived.

If the hash functions 302, 304 are assumed to be non-invertible (within computational complexity bounds), then one of the more fundamental concepts that can be verified from the block diagram shown in FIG. 3 is that neither of the embedded secret values can be determined by an outside observer in any manner other than by a (birthday-attack bound) random guess. Thus, it is not practical for an outside observer (who does not know the values of the embedded secrets) to predict a security core output resulting from any given input message. To an observer who is not in possession of a device's embedded secrets, but who can observe the system's input data, this output nonetheless appears similar in nature to that of a pseudo-random number generator (PRNG), although the actual output data is clearly dependent on the input and it is also obviously completely deterministic.

Finally, it should be noted that embodiments of this protocol can be realized in its entirely using a very low-complexity hardware design. Alternately, it can also be accomplished in software running on any standard processor that supports a suitably secure operational model. Of course, it is also possible to implement this security core using a standard hardware security module (HSM) platform, if the HSM supports a suitable keyed hash function and provided that its secure functions can be properly cascaded. In fact, there are a number of different means by which this basic "dual keyed hash, dual secret" structure may be implemented. The exact implementation choices made in the construction of this function will depend on various tradeoffs between the amount of "fixed" (i.e. One-time-programmable or OTP) registers, "static" or "persistent" (e.g. battery-backed or Flash memory-based) registers and computational resources available to the system designer. The basic structure shown in FIG. 3 is simply presented in a way that most easily illustrates the core operating principles.

Figure 5:
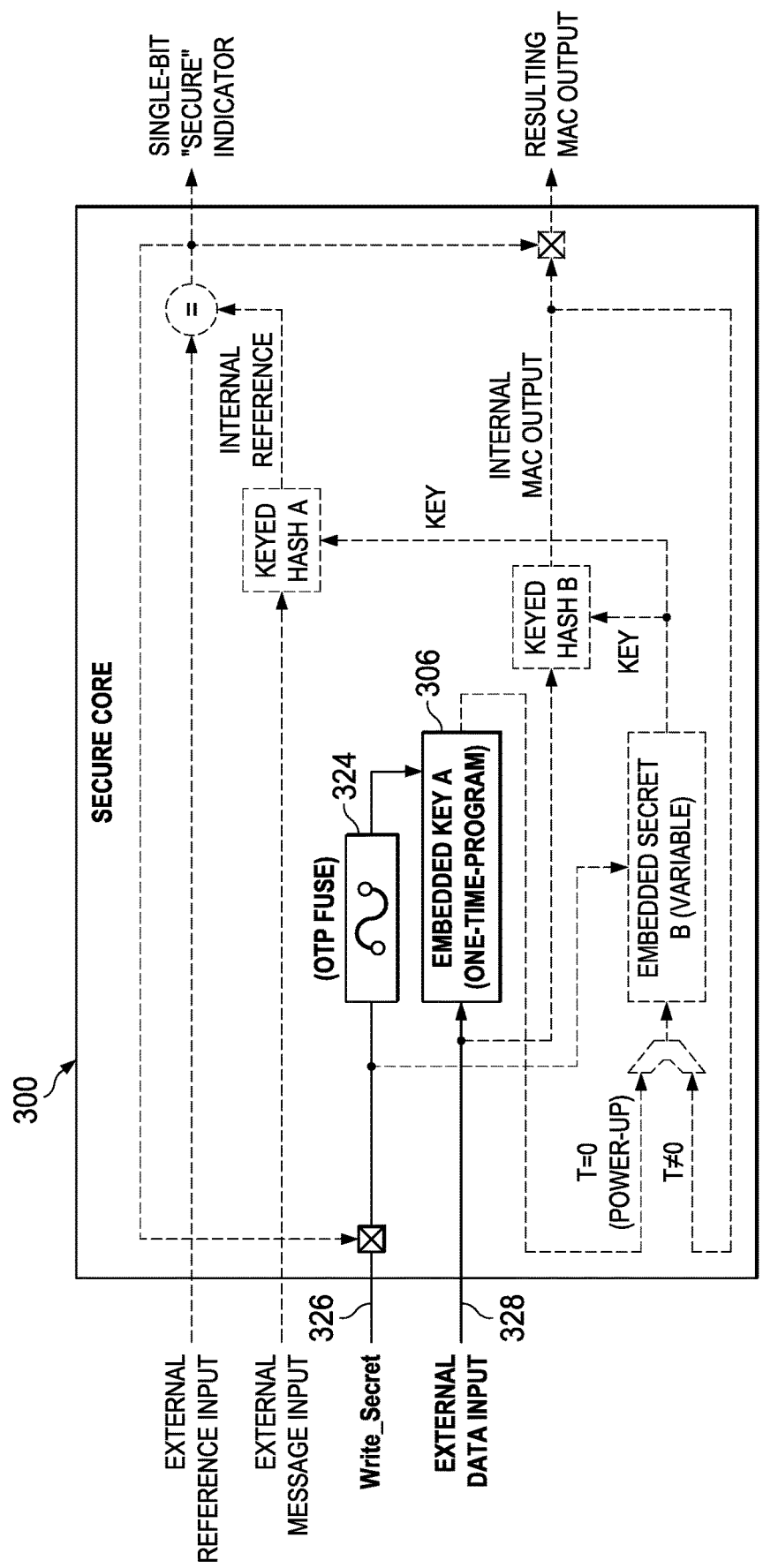
FIG. 5 depicts a block diagram of an embodiment of a security core during the initial provisioning process.
Figure 6:
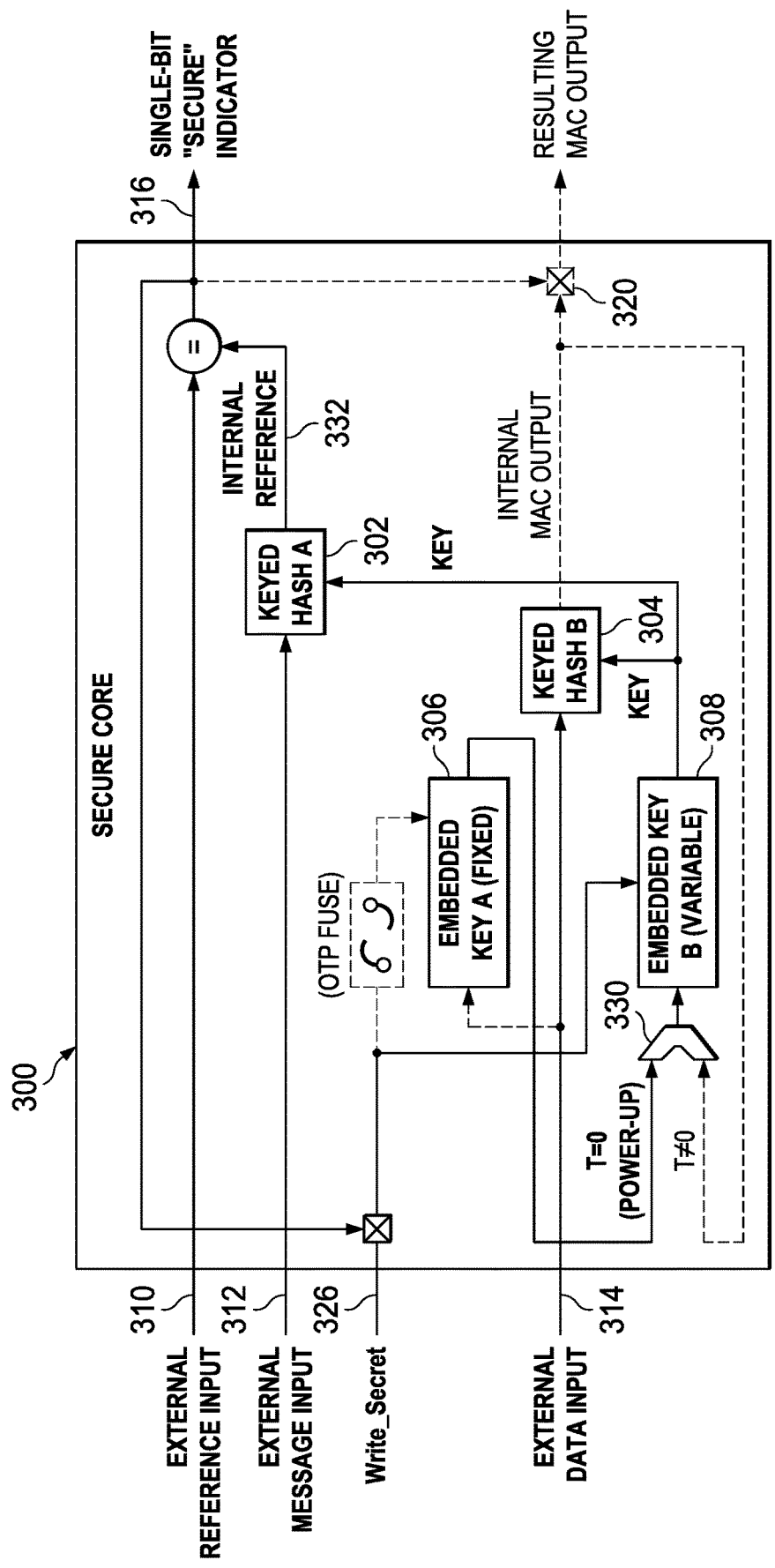
FIG. 6 depicts a block diagram showing an embodiment of newly-initialized security core using the initially provisioned secret to produce a derivative secret.
Figure 7:
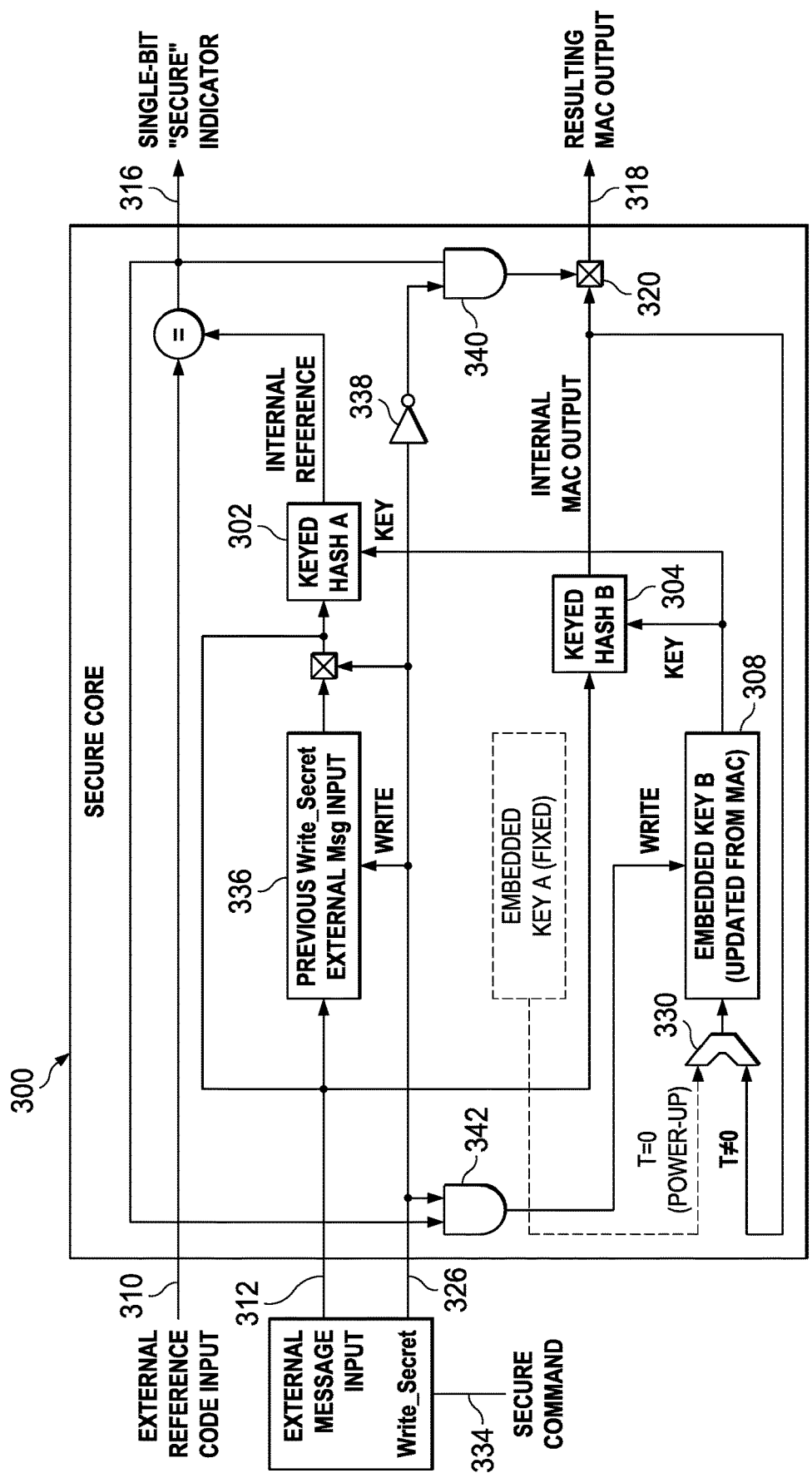
FIG. 7 depicts a block diagram of another embodiment of a security core illustrating how a secure command input is formed by the consolidation of external input data.

Following is a description of examples of initial device provisioning. Uninitialized devices may be those with unique serial numbers (i.e., CoreIDs), but no embedded secrets. Such devices are not capable of secure operation. The initialization process need not be performed at the chip fab. Uninitialized, but otherwise fully functional devices may be safely shipped to OEM assembly houses or to dedicated secure facilities for initial provisioning. FIGS. 5 and 6 illustrate an embodiment of a two-step process by which a device can be initialized (or "provisioned") at any suitable secure provisioning location. FIG. 7 shows how a provisioned device may then be registered with one or more third party service providers.

The first step in the provisioning process (shown in FIG. 5) is to create and program a known value (at input 328) into the embedded secret portion 404 (FIG. 4) of the device's embedded key A register 306. This embedded secret value represents the "root" (entropy seed) of the device and it is only programmable once. Once the part has been initialized with this embedded secret value, the OTP fuse 324 is burned, and the embedded secret value can neither be changed nor read back by external observers (authorized or not). Since this value represents the "root of trust" for the device's secure core 300, it should be generated with great care (e.g., it should exhibit good entropy).

Next, the embedded secret created in the previous step must thus be used, along with an arbitrarily-chosen external message input (input 312), to create an external reference code input for the device. These two numbers (the external message/reference code pair) are cryptographically bound to the device's root of trust (i.e., to the device's embedded key A value). Without at least one such cryptographically bound pair, the device's secure core is not usable. It should be noted, however, that even if both of these numbers are made public, such knowledge will not enable the device's "embedded secret" (root of trust) value to be exposed, either directly or indirectly.

If desired, more than one set of external message/reference code input pairs may be created during the initialization procedure, but after that is accomplished, the core's embedded secret value should be discarded. In this manner, the device's embedded secret need not be escrowed anywhere and, in fact, it should probably never be stored, for privacy and liability reasons. In the case where the device's embedded secret is internally-produced via some other mechanism (such as a PUF block output, for example), then this embedded secret value should never leave the device after the initialization procedure has been completed. If the device has the ability to generate both repeatable (e.g. PUF-style) and ephemeral entropy values on-chip, then such a device may be constructed in a manner that automatically produces the cryptographically-bound pairs described above without ever requiring that the embedded secret value be externally visible, even including during the initialization process. In such a case, then the "OTP" fuse bit 324 can be used to disable the generation of further cryptographically-bound pairs as described above. Once the OTP fuse bit 324 has been blown, the operational consequence for the device is the same, whether the device's embedded secret is externally-provided or internally-generated.

While the quality of the entropy for the device's embedded secret may be of paramount importance to the device's secure operation, the selection of the external message input(s) 312 used to create the associated external reference code (the output of hash function block 302) has much less impact on the system's overall security. This external message/reference code mechanism operates in a manner that is analogous to a password-based key derivation function (PBKDF). This means that the system can quickly generate moderate levels of effective operating entropy (internal reference values) from even low-entropy input stimuli (external messages 312). This is discussed below.

The next step (shown in FIG. 6) begins with a power-up reset of the newly-initialized device. Immediately after exiting the power-up reset state (i.e., T=0), the contents of the embedded Key (secret) A register 306 are transferred into the embedded key (secret) B register 308 via MUX 330. This embedded secret value is now present at the key inputs of the two keyed hash blocks 302 and 304. From this point on, the device can operate securely. However, as soon as the embedded key B register 308 is loaded, the internal reference value (the output 332 of the keyed hash A block 302) will also be updated. At that point, the output 316 of the internal comparator (the "secure" indicator) will then be cleared and the resulting MAC output will be disabled via gate 320.

As described earlier, the secure core's resulting MAC output 318 may be conditioned on whether or not the device has been provided with a correct external reference code input value (at input 310). The correct value for this reference code input 310 can only be calculated by an entity who is in possession of the secure core's "embedded secret A" (in addition to the CoreID, but the CoreID information is known). Also interesting to note is that the external control input that allows a device to update the embedded key B register 308 via the "write_secret" 326 input is also disabled in this case since this control input to register 308 is also conditioned on the "secure mode" bit 316. As before, only an entity who is in possession of the secure core's "embedded secret A" will be able to know the correct value for the reference code input 310 that is required to set this "secure mode" bit 316 to a "true". So, the embedded key B register 308 will also no longer be able to be updated unless the device is presented with a correctly-constructed external message/reference code pair. Thus, in the absence of such a valid external input pair, the secure core will remain quiescent. In effect, a valid external message/reference code input pair acts as an "unlock key" for the secure core. Since the key is public, this secure core "unlock" feature is subject to a significant replay attack weakness, where an attacker could replay a valid "write_secret" command but with an arbitrary (potentially malicious) external data input 314. Discussed below is a simple and inexpensive means for defending against this replay attack.

Consider the modified arrangement shown in the embodiment of FIG. 7. In this version of the design, we have incorporated the "write_secret" control input 326 mentioned above with a combined External Message/External Data input. Effectively, we have consolidated the previous External inputs (Message+Data+write_secret control) into a single monolithic "Secure Command" input 334 for the device. As with the previous version, there is an associated External reference code input 310 for this Secure Command 334 that cannot be predicted by an attacker without knowledge of the device's embedded secret. Since the "write_secret" bit has now been included in the Internal Reference calculation, it can also be seen that there are now two variants for each "Secure Command" that can be executed by a given secure core. This means that there are also two accompanying reference code input pairs (one for the Secure Command where the write_secret bit is a "1" and the other where the write_secret bit is a "0"). We will refer to these two operations as "Sign_msg" and "write_secret" commands. Both variants of the command will produce the same Internal MAC output from the secure core (as long as they are given the same External Data input), but they will require different reference code inputs in order to execute the two commands securely. Knowing a valid External reference code input for one operation will not allow an attacker to guess the proper reference value for the other command.

In the previous version of the design (shown in the embodiment of FIG. 6), we noted the potential for a replay attack, based on repeating the previous "write_secret" command (along with its associated external reference code input) paired with some arbitrary (potentially malicious) external data input. Fortunately, this issue can be simply and effectively solved by adding a single internal register 336 to the device (as shown in the embodiment of FIG. 7). The purpose of this register 336 is to save a copy of a secure command's external message input data field from the last successful "write_secret" command for use in the validation of a subsequent operation. Thus, if a successful "write_secret" command is ever repeated, its external reference code input will no longer be valid, since the internal value of this "previous write_secret external message input" register has been updated. In this manner, the External Message input data acts both as an entropy input (for the creation of new embedded secrets) as well as a nonce. This is a simple, but highly effective replay attack prevention mechanism.

In effect, the entity in possession of a device's current embedded secret can use that information to create an external reference code that can compel the device to update its secret to a new value. Thus, the entity with the knowledge of a device's current embedded secret acts as the "owner" of that device and only the "owner" of a device may provide the necessary information to transfer ownership of the device to a subsequent "owner". Note that an external attacker could ostensibly repeat the secure command sequence that writes a particular value to the Embedded Key B register 308 and then subsequently update its value to a new value (from the Internal MAC output of Hash block 304). However, this is not a replay attack per-se, since the only thing that the attacker can do is to repeat exactly the same sequence and place the device in exactly the same state as before. In other words, a potential replay attacker cannot act in a way that will cause the Embedded Key B register 308 to contain some value other than exactly the originally intended one. In addition, the actual value that is written into the Embedded Key B register 308 in such a case is unknown to an attacker, as will be explained in the next paragraph.

Returning to FIG. 7, we note a couple of simple additions to the internal control lines (the inverter 338 and the two AND functions 340, 342). The basic function of this additional logic is to disable the secure core's output 318 during the execution of a "write_secret" secure command. In contrast, the output 318 is enabled in the case of a valid "sign_msg" secure command. This way, a device can create (and export) a signature from any input message, based on its embedded secret. That signature can only be recreated (authenticated) by some other entity who is in possession of that same embedded secret. It should be noted that there are a number of different potential means to embed this desired functionality into the system all of which are contemplated herein; the example shown in FIG. 7 is simply an easy-to-understand method by which this mechanism may be enabled.

At this point, we now have all of the pieces necessary to securely register (synchronize) a given secure core's embedded secret value with some entity and to subsequently update (rotate) this secret in a simple and secure manner. We will refer to this entity as a registration or provisioning service, but it may be just simply be some other device.

In embodiments, the first part of the protocol (device registration) is a three-step process comprising acquiring the proper "permission" to create a new embedded secret for a given device from one entity (the device's current provisioning service), creating the new secret on the device itself (and thereby sharing it with a second entity) and then finally writing this newly-created secret to the secure core device. This registration process may be accomplished in three basic steps—and all without knowing the existing value of the device's embedded secret by the second entity. The latter part of the protocol involves updating (rotating) the device's embedded secret. This procedure can be accomplished securely in a single step and may be repeated as many times as necessary in order to keep the device's embedded secret (and thus, the device's secure operation) safe from compromise.

Figure 8:
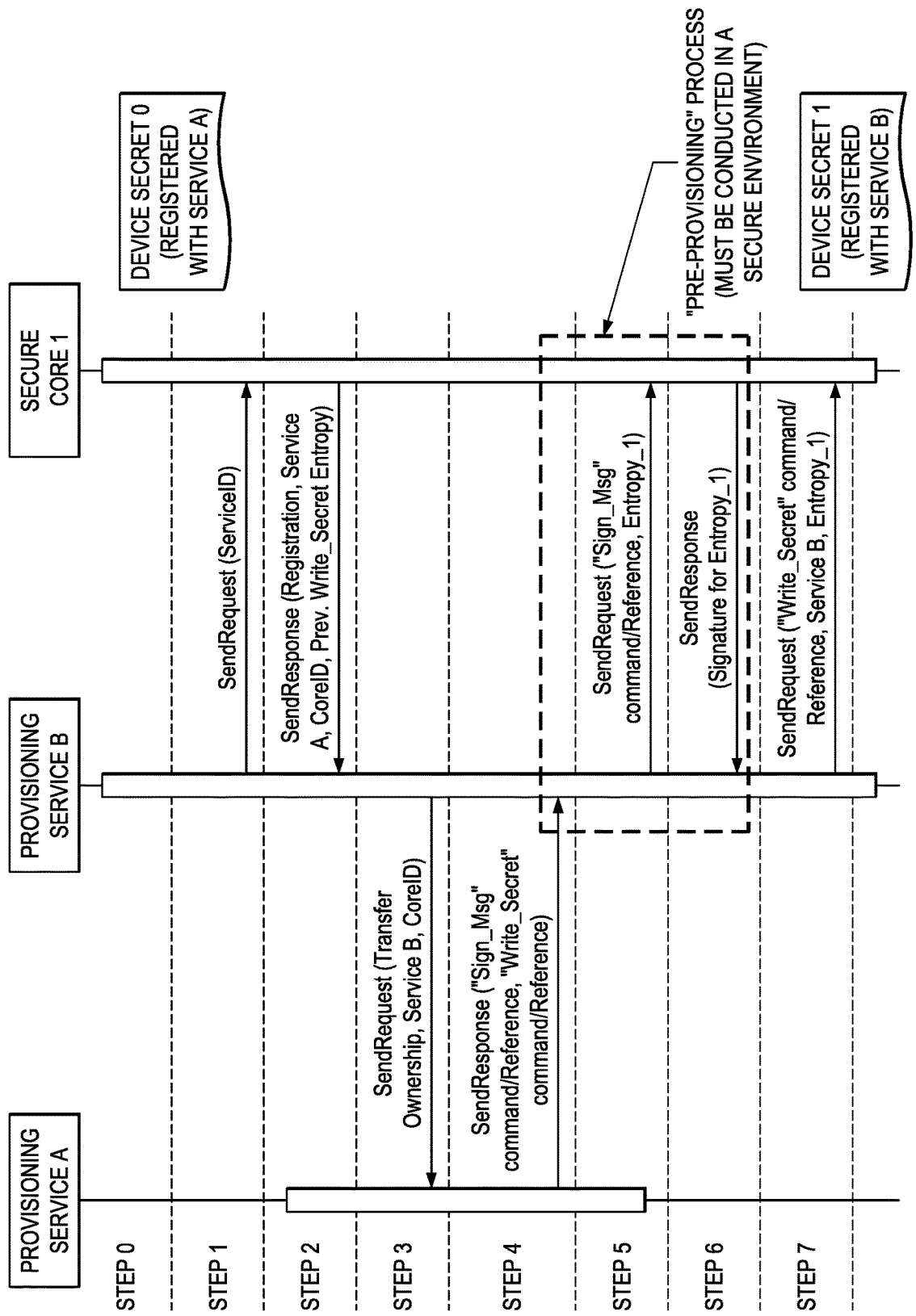
FIG. 8 is a sequence diagram illustrating an embodiment of a method for registering a device with a new provisioning service.

Following is a description of embodiments relating to secure device registration portion of the protocol. The first step in this process involves the synchronization of a secure device's embedded secret value with some other entity. We will refer to a simple mechanism by which a secure device can be provisioned is the case where the device is initially provisioned in a secure location (e.g., the device is safe from eavesdropping during the initial provisioning process). FIG. 8 is a sequence diagram illustrating an embodiment of a method for registering a device (with a new provisioning service). FIG. 8 is described in the context to a first provisioning service (Provisioning Service A), a second provisioning service (Provisioning Service B), and a secure core (Secure Core 1). In the example illustrated in FIG. 8, the initial power-up state (Step 0) for the Secure Core 1 device is that contains Device Secret 0 (e.g., its static embedded). As discussed earlier, this Device Secret 0 value need not actually be known by Provisioning Service A, but the secure core can nonetheless be managed by Service A because it is in possession of the proper external reference code values for the "sign_msg" and "write_secret" commands.

Step 1 in the registration process involves Provisioning Service B requesting the secure core 1 device's "ServiceID" (i.e., which service provider is the "owner" of the secure core 1 device). Secure Core 1 responds in Step 2 with the identity of Provisioning Service A and its own CoreID. In Step 3, Provisioning Service B then sends a request to Service A for transfer of ownership of secure core 1. The subsequent response in Step 4 from Service A to Service B (which should be transmitted in encrypted form, since it contains sensitive information) includes the proper external reference code inputs for secure core 1 for the "Sign_Msg" and "write_secret" commands. In Step 5, Service B then uses the first of these two reference code inputs, to request secure core 1 to sign a message consisting of a locally-generated nonce value (Entropy_1). The resulting signature received back from the Secure Core 1 in Step 6 device contains the resulting signature of the entropy_1 value, which is the same value that will be created by the device in response to a "write_secret" command containing the "Entropy_1" argument in Step 7. This signature is also the new embedded secret (Device Secret 1) for the secure core 1 device.

Note that this embodiment of a registration process may only be secure if the three transactions contained within the dashed line (Steps 4-6) (referred to as the "Pre-provisioning" process) are conducted within a controlled environment (e.g., one that is free from eavesdroppers). In the pre-provisioning process cannot be conducted in a secure environment, then the value of the derived embedded secret should be encrypted prior to leaving the confines of the device. The use of a public-private key pair in this case allows the managing service (i.e., the service that currently "owns" the device) to specify a previously-determined service to which the control of this device is to be transferred. Note that this public-key encrypt method need only happen once (in the case where the derived embedded secret must be generated in a non-secure environment). In that case, then the use of the hash of the pre-selected service's public key as one of the inputs to the creating of the Internal Reference will cryptographically bind the (public-key encrypted) derived embedded secret to that pre-selected service. This acts as protection against attackers who try to "hijack" the secure operation of a device by replacing the public key of the pre-selected service with that of a different service.

The description above thus describes embodiments of a basic foundation of a mechanism for synchronizing a secret between a simple secure device and a service provider. This synchronization (registration) process effectively transfers transferring control of the device from one service to another in a secure fashion. While there are several approaches by which this ownership transfer can be accomplished (all of which are contemplated herein), the example described above is a simple case.

Now that Service B has acquired the prospective value of Device Secret 1 (Step 6 of FIG. 9), then Steps 1-6 need never be repeated. In other words, once Service B has acquired both the requisite reference codes for Secure Core 1, then it can perform the transition from the Device Secret 0 state to the Device Secret 1 state and from that state directly to any subsequent device secret state without requiring the secure device to report the resulting value. Thus, this device secret rotation can be effected in the field by going directly from the power-on state (Step 0) to the "write_secret" command (Step 7).

Figure 9:
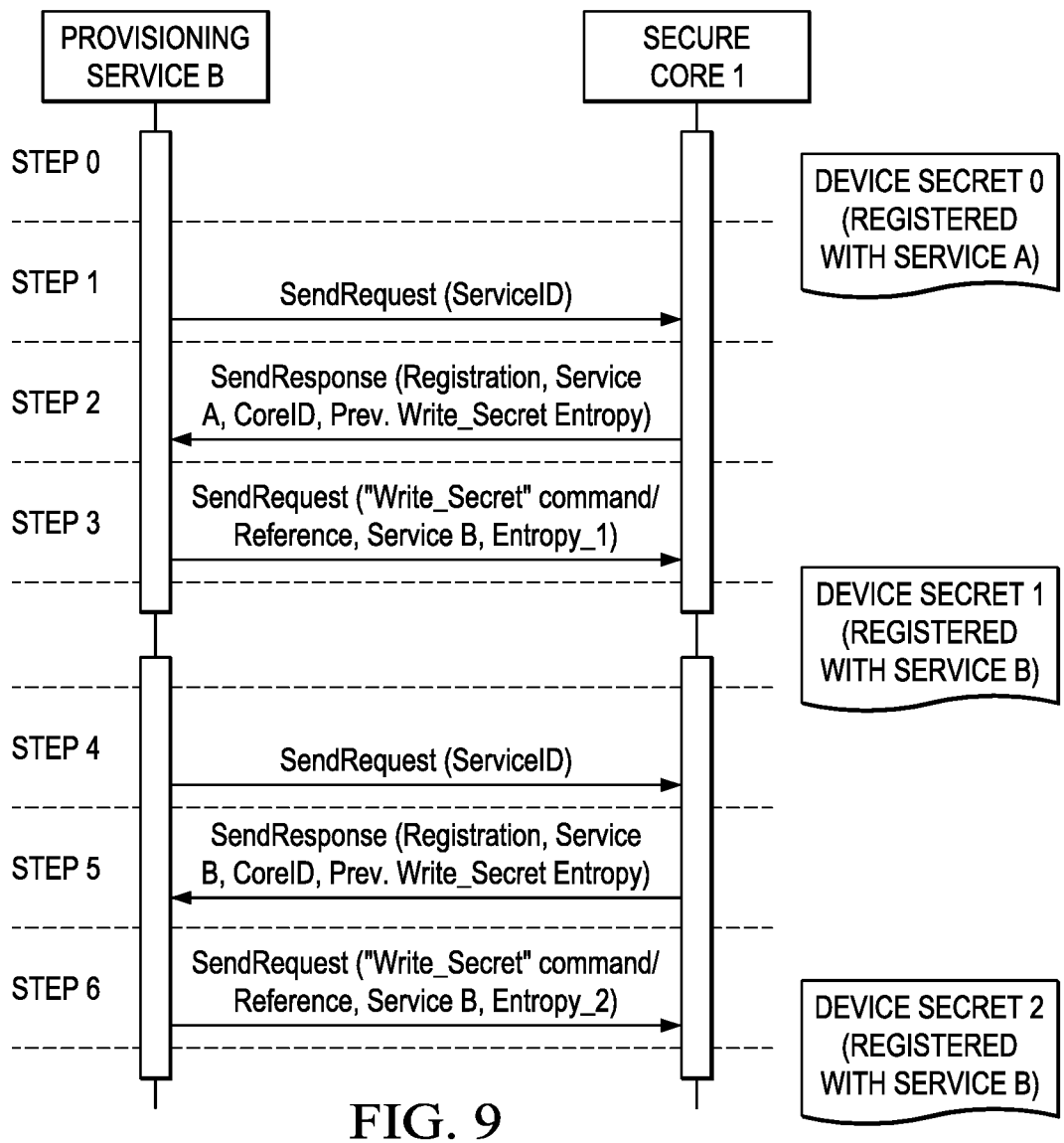
FIG. 9 is a sequence diagram illustrating a post-registration secure provisioning process that may occur in the field.

FIG. 9 is a sequence diagram illustrating a "post-registration" provisioning process. In this manner, the entire initial key provisioning and key rotation protocol (Steps 0-6 in FIG. 9) in can be performed in the open without fear of exposing any of the device's secrets to external observers. Each time the device's embedded secret is updated, the Provisioning Service B can calculate the resulting embedded secret simply by sending the device a new external entropy value.

This can happen without requiring the device to calculate the new value and then report it back to the service (as per Step 6 in FIG. 8). This can happen indefinitely, as long as the service keeps a local copy of the device's current embedded secret (and the device reports back the most recent external entropy value that was used to create the current embedded secret) as a part of its response to the "ServiceID" request. This way, the service need not archive the extra information (the most recent external entropy value) for all of the devices that it manages.

Earlier, we mentioned that the keyed hash-based KDF structure described above has an interesting property in that it behaves in a manner that is similar to standard cryptographic Password-based Key Derivation Functions (PB-KDF's). In such systems, the user typically supplies a (low-entropy) password and the system then combines this password with a random salt (nonce) and an iteration count (which defines how many times the KDF cycles the combined input through a one-way hash function) in order to create an encryption key. NIST publication SP800-56A/B/C define several options for such KDF's and these kinds of KDFs are also standardized in ISO-18033-2 specifications (hereby incorporated by reference in their entirety).

Some systems may have bandwidth limitations that prevent the service from providing its managed devices large amounts of entropy in the external message data input. We can nonetheless make use of the basic concepts contained within these standards to produce the maximum amount of effective security that can be accomplished within the limitations of such a low-bandwidth system.

Thus, the mechanism outlined in the embodiment of FIG. 7 may be used with a truncated external message input data (as few as 4 bits may be enough for practical purposes, if the keys are rotated frequently enough). As mentioned above, the effective entropy for the MAC output of the keyed hash depends much more heavily on the entropy of the embedded key than that of the external input data. In fact, in the case of message authentication, the entropy of the raw message data itself can act to produce a relatively high effective entropy in the derived MAC (the signature of the message data itself). This is primarily due to the fact that the structure shown in FIG. 7 uses a dual keyed hash structure where the key input for the authentication itself (the signature generation portion—i.e., keyed hash B 304) is iterated at least twice—once for the KDF and a second time for each signature generation. Thus, even a highly-truncated input data field to the keyed hash may still nonetheless provide sufficient effective entropy for the derived keys (from the first pass through keyed hash B 304) such that the key rotation required in practice is much lower than other schemes where the full key value must be effectively transmitted directly (even if it is transmitted in encrypted form).

While there is a certain cost of cycling through the keyed hash function twice at every node when the keys are in the process of being rotated, under normal use cases (i.e., during simple authenticated message transmission, the keyed hash B function need only be iterated once (per message authentication).

In some cases, it may be desirable to provision the same embedded secret value to a number of devices. This can be referred to this as a "group key" scenario and it is useful to allow multiple devices to authenticate each other's messages quickly and efficiently. For example, a vendor may want to push software updates to a group of devices that share a same authorization code for a particular update that will be accepted by all of them, rather than creating a unique authorization code for each of the devices. In this example, certain portions of an embedded key (e.g., serial numbers, etc.) can be masked out, or group numbers can be written in place of unique serial numbers, for example. Referring back to the embedded key depicted in FIG. 4, it can be seen that, even in the case where all devices possess the same embedded secret 404, they still could not impersonate each other, due to the fact that they must still have distinct embedded keys (assuming, for example, that the devices had distinct serial numbers).

Figure 10:
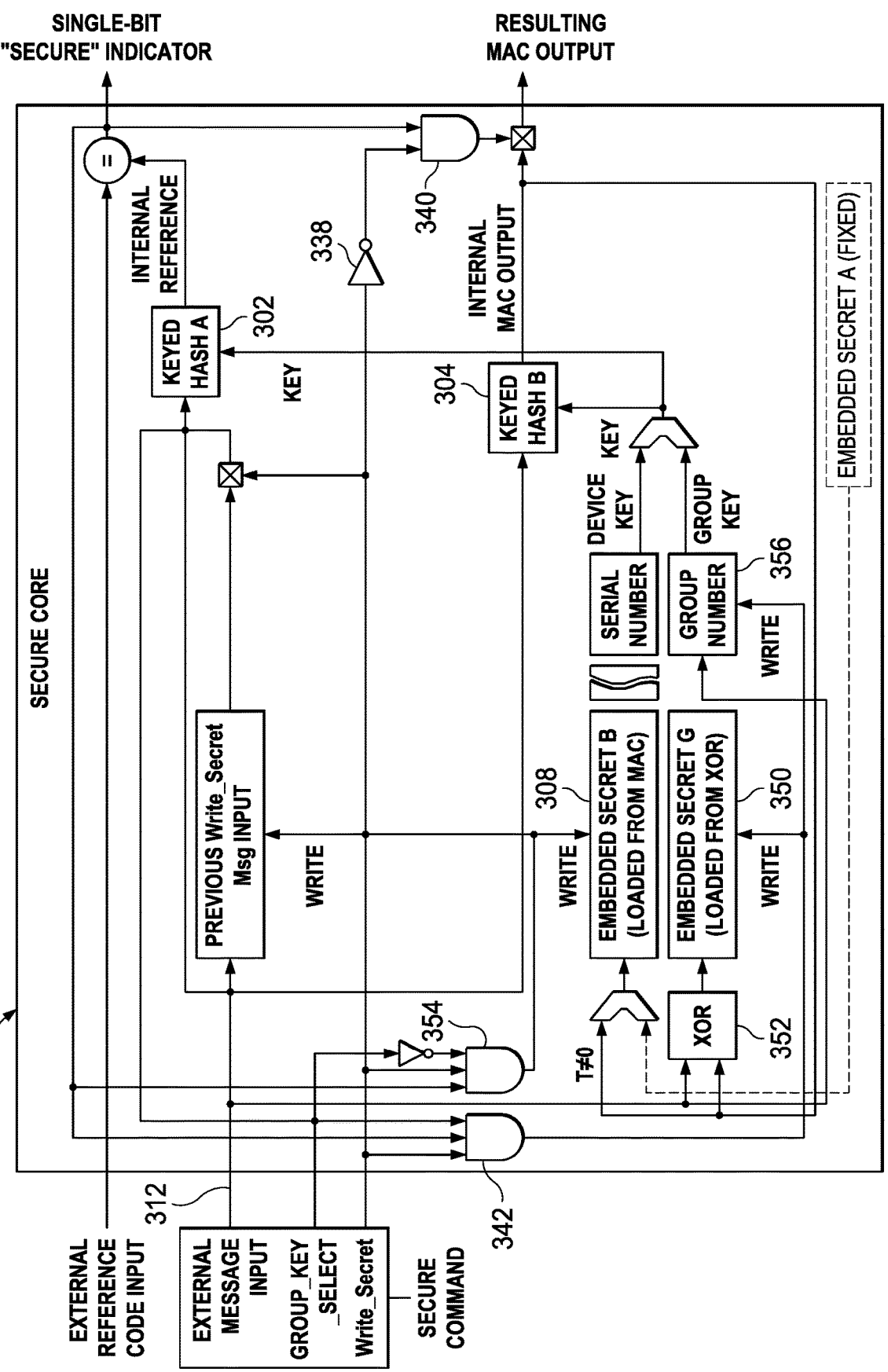
FIG. 10 depicts a block diagram of a secure core that supports group key operation.

Thus, in the case where any device of a particular group has the same embedded key value (e.g., not just the same embedded secret), then we may need to provide a mechanism for each device to identify itself as being part of a (known) group as well as ensuring that the device will have the same embedded key value. One design that can support such a scenario is shown in the embodiment of FIG. 10. FIG. 10 is a block diagram of a secure core that supports group key operation. The embodiment shown in FIG. 10 is similar to the embodiment shown in FIG. 7, with the addition of the embedded secret G 350, and three AND gates 340, 342, and 354. Note that the AND gate 342 enables the writing of a new group number into a group key register 356 in a secure manner.

Note that, in this the example shown in FIG. 10, some of the individual fields of the embedded key are broken out for clarity. The reason for this is the differentiation in the visibility (and thus, how the data in the field should be loaded) between the public portions of the embedded key (the CoreID field) and the private (embedded secret) portion of the embedded key.

The manner by which the "embedded secret G" 350 (e.g., the embedded secret portion of the group key) data is loaded includes the derivation of a MAC output from keyed hash B 304 (just as with the process for loading the embedded secret B register 308. However, in the case of a group secret, the output of the keyed hash B 308 (the internal MAC output value) is XOR-ed (via XOR function 352) with a corresponding input field from the external message input data 312. This way, an entity that can correctly calculate the resulting internal MAC output value can also create a separate value for "transforming" between the internal MAC output value and the desired group secret. However, an attacker will have knowledge of neither the internal MAC output nor the shared group secret that is derived in this manner. Thus, if the value for the "group secret" is selected well (e.g., it has maximum entropy), then the knowledge of even a large collection of external message input data 312 will still not provide any information to an attacker about the value of the embedded secret for the group.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A method for provisioning a device with an embedded secret comprising:
   providing a first embedded key hardware register in the device;
   providing a second embedded key hardware register in the device;
   providing a pair of keyed hash functions in the device;
   permanently writing a known value into the first embedded key hardware register in the device to create an embedded secret;
   receiving a first external reference code from a source external to the device; and creating a second external reference code by hashing the received first external reference code using one of the keyed hash functions, wherein the keyed hash function is keyed using the embedded secret created by the permanent writing of the known value into the first embedded key hardware register wherein creating the second external reference code includes at device power-up, transferring the contents of the first embedded key register to the second embedded key register, where the contents of the second embedded key register are provided as a key to the one of the keyed hash functions, and wherein at device power-up, the contents of the second embedded key register are updated with a value derived from the known value permanently written in the first embedded key register; and providing an internal MAC output by hashing a message input using the contents of the second embedded key register as the key to one of the keyed hash functions.

2. The method of claim 1, wherein the derived value is derived by hashing an external message input using the known value as the key to a hash function.

3. The method of claim 1, further comprising:
receiving an external reference code input value; and
comparing the received external reference code input value to a calculated internal reference.

4. The method of claim 3, further comprising conditioning the availability of the internal MAC output based on the comparison of the received external reference code input value to the calculated internal reference.

5. The method of claim 4, wherein the internal MAC output is made available outside the device only when the received external reference code input value matches the calculated internal reference.

6. A system for provisioning a device with an embedded secret comprising:
a processor;
a secure execution controller;
first and second embedded key hardware registers in the device; and
at least one non-transitory computer-readable storage medium storing computer instructions translatable by the processor to perform:
providing a pair of keyed hash functions in the device;
receiving a first external reference code from a source external to the device;
permanently writing a known value into the first embedded key hardware register in the device to create an embedded secret; and
creating a second external reference code by hashing the received first external reference code using one of the keyed hash functions, wherein the keyed hash function is keyed using the embedded secret created by the permanent writing of the known value into the first embedded key hardware register wherein creating the second external reference code includes at device power-up, transferring the contents of the first embedded key register to the second embedded key register where the contents of the second embedded key register are provided as a key to the one of the keyed hash functions, and wherein at device power-up, the contents of the second embedded key register are updated with a value derived from the known value permanently written in the first embedded key register; and
providing an internal MAC output by hashing a message input using the contents of the second embedded key register as the key to one of the keyed hash functions.

7. The system of claim 6, wherein the derived value is derived by hashing an external message input using the known value as the key to a hash function.

8. The system of claim 6, wherein the instructions translatable by the processor further comprise:
receiving an external reference code input value; and
comparing the received external reference code input value to a calculated internal reference.

9. The system of claim 8, wherein the instructions translatable by the processor further comprise conditioning the availability of the internal MAC output based on the comparison of the received external reference code input value to the calculated internal reference.

10. The system of claim 9, wherein the internal MAC output is made available outside the device only when the received external reference code input value matches the calculated internal reference.

11. A method for provisioning a device with a group secret key that is sharable with similar devices comprising:
providing a first embedded key hardware register in the device;
providing a second embedded key hardware register in the device;
providing a pair of keyed hash functions in the device;
permanently writing a known value into the first embedded key hardware register in the device to create an embedded secret;
at device power-up, transferring the contents of the first embedded key register to the second embedded key register, wherein the contents of the second embedded key register are provided as a key to one of the pair of keyed hash functions;
after device power-up, updating the contents of the second embedded key register with a value derived from the known value permanently written in the first embedded key register;
providing an internal MAC output by hashing a message input using a derivation of the contents of the first embedded key register as the key to one of the pair of keyed hash functions;
receiving an external message input from a source external to the device; and
using the internal MAC output and the external message input to derive a group secret key, wherein the group secret key includes secret portion and a public portion, and wherein the public portion of the group secret key identifies a group to which the device belongs.

12. The method of claim 11, further comprising generating an embedded secret from internal MAC output and an input field from the external message input using an exclusive OR function.

13. The method of claim 11, further comprising a third embedded key register in the device, wherein the derived group secret key is stored in the third embedded key register.

* * * * *